United States Patent
Fischer et al.

(10) Patent No.: US 8,087,171 B2
(45) Date of Patent: Jan. 3, 2012

(54) METHOD OF INSTALLING AXIALLY ADJUSTABLE DRIVESHAFT ASSEMBLY

(75) Inventors: Eric M. Fischer, Maumee, OH (US); Johnny N. Smith, Toledo, OH (US)

(73) Assignee: Dana Automotive Systems Group, LLC, Maumee, OH (US)

(*) Notice: Subject to any disclaimer, the term of this patent is extended or adjusted under 35 U.S.C. 154(b) by 405 days.

(21) Appl. No.: 12/220,545

(22) Filed: Jul. 25, 2008

(65) Prior Publication Data

US 2009/0029783 A1    Jan. 29, 2009

Related U.S. Application Data

(60) Provisional application No. 60/962,256, filed on Jul. 27, 2007.

(51) Int. Cl.
*B21D 53/88* (2006.01)

(52) U.S. Cl. .... 29/897.2; 29/897; 137/526; 137/533.25; 403/15; 464/162

(58) Field of Classification Search ................. 29/897.2, 29/897, 407.01, 452; 464/16, 26, 134, 162, 464/173, 180; 403/15; 417/269; 137/516.29, 137/526, 533.25
See application file for complete search history.

(56) References Cited

U.S. PATENT DOCUMENTS

| | | | | |
|---|---|---|---|---|
| 4,003,219 A * | 1/1977 | Stull | | 464/26 |
| 4,643,221 A * | 2/1987 | Parker | | 137/516.29 |
| 5,358,001 A | 10/1994 | Smith | | |
| 5,716,276 A * | 2/1998 | Mangas et al. | | 464/16 |
| 5,772,520 A | 6/1998 | Nicholas et al. | | |
| 6,023,830 A * | 2/2000 | Cole et al. | | 29/407.01 |
| 6,722,991 B2 * | 4/2004 | Chrobak et al. | | 464/17 |
| 7,052,398 B2 | 5/2006 | Robb | | |

* cited by examiner

*Primary Examiner* — Richard Chang

(74) *Attorney, Agent, or Firm* — Marshall & Melhorn LLC

(57) ABSTRACT

A method of installing an axially adjustable driveshaft assembly in a drive train system is described. Two hollow driveshaft sections, where one has a valve through an aperture in it and each has an end fitting, engage each other to form an axially adjustable driveshaft assembly that has a sealed internal chamber within. When a pressurized air or vacuum source is connected to the valve, air fills the chamber or air is removed from the chamber, which correspondingly increases or decreases a drive train system length. This results in facilitating the installation of the driveshaft assembly between a transmission and an axle assembly in a drive train system.

12 Claims, 4 Drawing Sheets

METHOD OF INSTALLING AXIALLY ADJUSTABLE DRIVESHAFT ASSEMBLY

CROSS-REFERENCE TO RELATED APPLICATIONS

This application claims the benefit of U.S. Provisional Application No. 60/962,256, filed Jul. 27, 2007, the disclosure of which is incorporated herein by reference.

BACKGROUND OF THE INVENTION

This invention relates in general to axially adjustable driveshaft assemblies, such as are commonly used in drive train systems. In particular, this invention relates to an improved structure for such an axially adjustable driveshaft assembly and to a method of installing same in a drive train system.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft tube to the input shaft of the axle assembly, while accommodating a limited amount of angular misalignment between the rotational axes of these three shafts.

Not only must a typical drive train system accommodate a limited amount of angular misalignment between the source of rotational power and the rotatably driven device, but it must also typically accommodate a limited amount of relative axial movement therebetween. For example, in most vehicles, a small amount of relative axial movement frequently occurs between the engine/transmission assembly and the axle assembly when the vehicle is operated. To address this, it is known to provide a slip joint in the driveshaft assembly. A typical slip joint includes first and second members that have respective structures formed thereon that cooperate with one another for concurrent rotational movement, while permitting a limited amount of axial movement to occur therebetween.

One type of slip joint that commonly used in conventional driveshaft assemblies is a sliding spline type of slip joint. A typical sliding spline slip joint includes male and female members having respective pluralities of splines formed thereon. The male member is generally cylindrical in shape and has a plurality of outwardly extending splines formed on the outer surface thereof. The male member may be formed integrally with or secured to an end of the driveshaft assembly described above. The female member, on the other hand, is generally hollow and cylindrical in shape and has a plurality of inwardly extending splines formed on the inner surface thereof. The female member may be formed integrally with or secured to a yoke that forms a portion of one of the universal joints described above. To assemble the slip joint, the male member is inserted within the female member such that the outwardly extending splines of the male member cooperate with the inwardly extending splines of the female member. As a result, the male and female members are connected together for concurrent rotational movement. However, the outwardly extending splines of the male member can slide relative to the inwardly extending splines of the female member to allow a limited amount of relative axial movement to occur between the engine/transmission assembly and the axle assembly of the drive train system.

In order to facilitate relative axial movement between the male and female splined members, a certain amount of clearance is provided between the mating splines provided thereon. However, a relatively large amount of clearance between the mating splines is undesirable because it results in looseness between the male and female splined members. Looseness that occurs in the rotational direction of the splined members, wherein one of the splined members can rotate relative to the other splined member, is referred to as backlash. Looseness that occurs in the axial direction of the splined members, wherein one of the splined members can extend at a cantilevered angle relative to the other splined member, is referred to as broken back. To reduce the adverse effects of such looseness, it is desirable that the amount of clearance provided between the mating splines of the male and female splined members be minimized.

Unfortunately, when the amount of clearance provided between the mating splines of the male and female splined members is relatively small, the magnitude of the force that is required to effect relative axial movement of the male and female members is relatively large. Although this relatively large magnitude of force is usually not of any consequence during normal operation of the drive train system, it can make it relatively difficult to initially install the driveshaft assembly in a drive train system. During such installation, the distance separating the source of rotational power from the rotatably driven mechanism is usually fixed. Typically, however, the driveshaft assembly has a length that is often different from the fixed distance separating the source of rotational power from the rotatably driven mechanism. Thus, to install the driveshaft assembly in the drive train system, the length of the driveshaft assembly must usually first be adjusted to correspond with the distance separating the source of rotational power from the rotatably driven mechanism.

In the past, this initial relative axial movement of the male and female members of the driveshaft assembly to facilitate installation has been accomplished manually by the person or persons who have been tasked to install the driveshaft assembly within the drive train system. However, as noted above, the magnitude of the force that is required to effect relative axial movement of the male and female members can be relatively large, making such manual extension or retraction difficult. Thus, it would be desirable to provide an improved structure for an axially adjustable driveshaft assembly, and a method of installing same in a drive train system, that avoids these problems.

SUMMARY OF THE INVENTION

This invention relates to an improved structure for an axially adjustable driveshaft assembly and to a method of installing same in a drive train system. The axially adjustable driveshaft assembly includes a first section and a second section that engages the first section for relative axial movement. The first and second sections cooperating to define an internal chamber. A valve is provided on one of the first and second sections and provides fluid communication with the internal chamber. The valve may have a passageway portion formed therethrough and first and second sealing lip portions that normally engage one another so as to provide an air-tight seal therebetween. The axially adjustable driveshaft assembly may be installed in a drive train system by varying the pressure within the internal chamber so as to change the length defined by the axially adjustable driveshaft assembly to equal a length defined by the drive train system and installing the axially adjustable driveshaft assembly in the drive train system.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
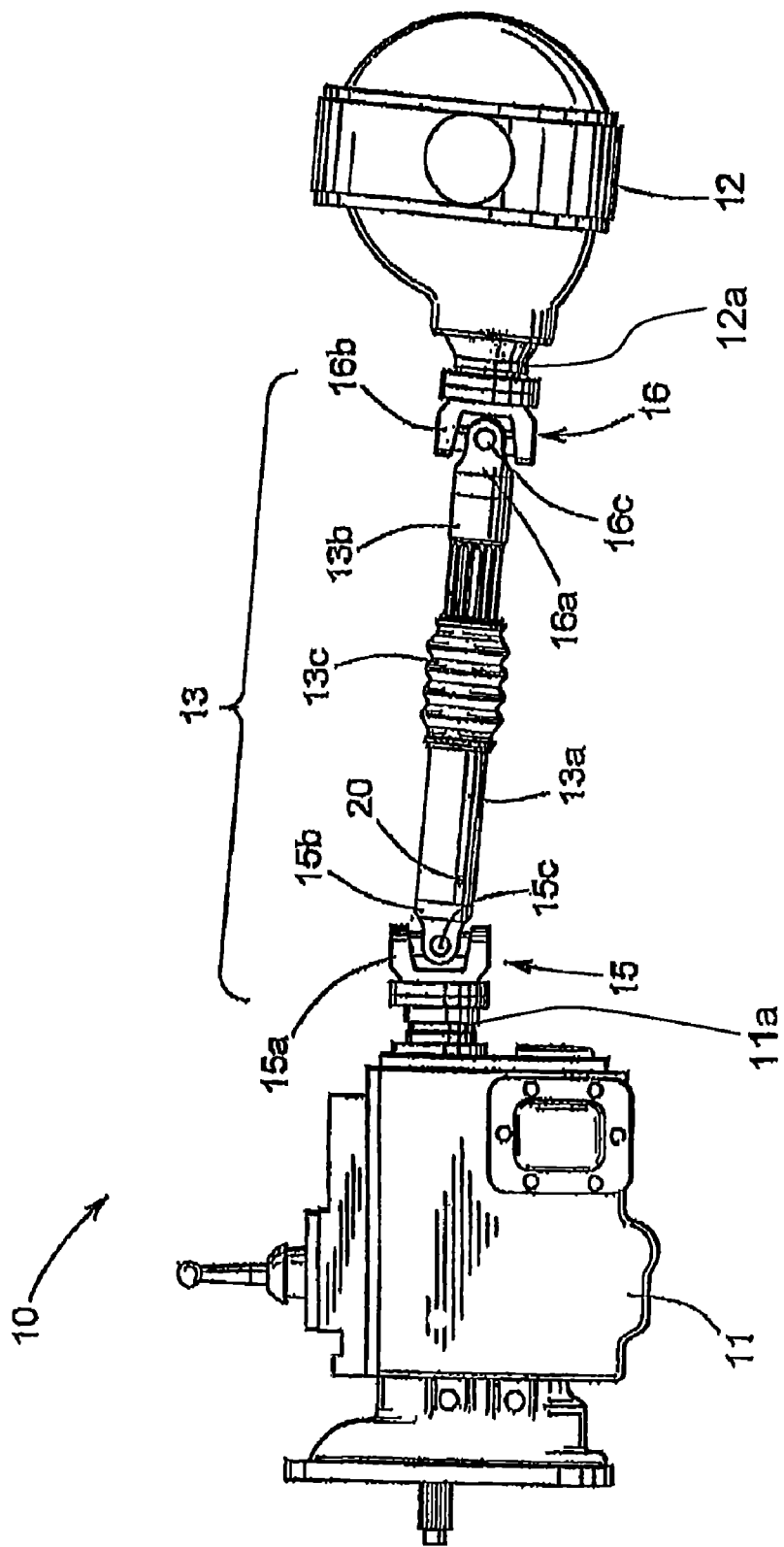
FIG. 1 is a side elevational view of a vehicle drive train system including an axially adjustable driveshaft assembly in accordance with this invention.

Referring now to the drawings, there is illustrated in FIG. 1 a drive train system, indicated generally at 10, in accordance with this invention. The illustrated drive train system 10 is, in large measure, conventional in the art and is intended merely to illustrate one environment in which this invention may be used. Thus, the scope of this invention is not intended to be limited for use with the specific structure for the drive train system 10 illustrated in FIG. 1. On the contrary, as will become apparent below, this invention may be used in any desired environment for the purposes described below.

The illustrated drive train system 10 is a vehicular drive train system that includes a transmission 11 having an output shaft 11a that is connected to an input shaft 12a of an axle assembly 12 through an axially adjustable driveshaft assembly 13. The axially adjustable driveshaft assembly 13 may be embodied as any two (or more) components that are connected together for concurrent rotational movement and for relative axial movement. In the illustrated embodiment, the axially adjustable driveshaft assembly 13 includes a first driveshaft section 13a and a second driveshaft section 13b.

The illustrated first driveshaft section 13a is a female splined member that is generally hollow and cylindrical in shape, having a plurality of inwardly extending splines formed on the inner surface thereof. The illustrated second driveshaft section 13b is a male splined member that is generally hollow and cylindrical in shape, having a plurality of outwardly extending splines formed on the outer surface thereof. However, the first and second driveshaft sections 13a and 13b may be embodied having any desired shapes or combination of shapes.

The driveshaft assembly 13 is assembled by inserting the first driveshaft section 13a about the second driveshaft section 13b such that the outwardly extending male splines of the second driveshaft section 13b cooperate with the inwardly extending female splines of the first driveshaft section 13a. As a result, the first and second driveshaft sections 13a and 13b are connected together for concurrent rotational movement. However, the outwardly extending splines of the second driveshaft section 13b can slide axially relative to the inwardly extending splines of the first driveshaft section 13a to allow a limited amount of relative axial movement to occur therebetween. As a result, the driveshaft assembly 13 can accommodate a limited amount of relative axial movement between the transmission 11 and the axle assembly 12 during operation. A flexible boot 13c or other protective structure may be provided over the adjacent portions of the first and second driveshaft sections 13a and 13b of the driveshaft assembly 13 in order to prevent dirt, water, and other contaminants from entering into the region of the cooperating male and female splines.

The output shaft 11a of the transmission 11 and the input shaft 12a of the axle assembly 12 are typically not co-axially aligned. To accommodate this, the drive train system 10 further includes first and second universal joints, indicated respectively at 15 and 16. The universal joints 15 and 16 are conventional in the art and may each be embodied as any desired structure or structures that provide a rotational driving connection between input and output members, while accommodating a limited amount of angular misalignment between the rotational axes thereof. The first universal joint 15 is provided to connect the output shaft 11a of the transmission 11 to the first driveshaft section 13a of the driveshaft assembly 13. In the illustrated embodiment, the first universal joint 15 includes a first end fitting 15a that is connected to the output shaft 11a of the transmission 11, a second end fitting 15b that is connected to the forward end of the first driveshaft section 13a, and a cross assembly 15c that is connected to both the first end fitting 15a and the second end fitting 15b. Similarly, the second universal joint 16 is provided to connect the second driveshaft section 13b of the driveshaft assembly 13 to the input shaft 12a of the axle assembly 12. In the illustrated embodiment, the second universal joint 16 includes a first end fitting 16a that is connected to a rearward end of the second driveshaft section 13b, a second end fitting 16b that is connected to the input shaft 12a of the axle assembly 12, and a cross assembly 16c that is connected to both the first end fitting 16a and the second end fitting 16b.

When the first and second driveshaft sections 13a and 13b are assembled together as described above, an internal chamber 17 (see FIGS. 3 and 4) is defined within the driveshaft assembly 13. The extent of the internal chamber 17 is limited by the interior surfaces of the first and second driveshaft sections 13a and 13b, by the end fitting 15b that is connected to the forward end of the first driveshaft section 13a, and by the end fitting 16a that is connected to the rearward end of the second driveshaft section 13b. The internal chamber 17 of the driveshaft assembly 13 is relatively air-tight. This is because the amount of clearance that is provided between the mating splines of the first and second driveshaft sections 13a and 13b is relatively small. Thus, the ability of air to flow into or out of the internal chamber 17 through the mating splines of the first and second driveshaft sections 13a and 13b is relatively limited. It is known to provide either or both of the end fittings 15b and 16a with a conventional vent plug (not shown). However, the ability of air to flow into or out of the internal chamber 17 through such vent plugs is also relatively limited.

Figure 4:
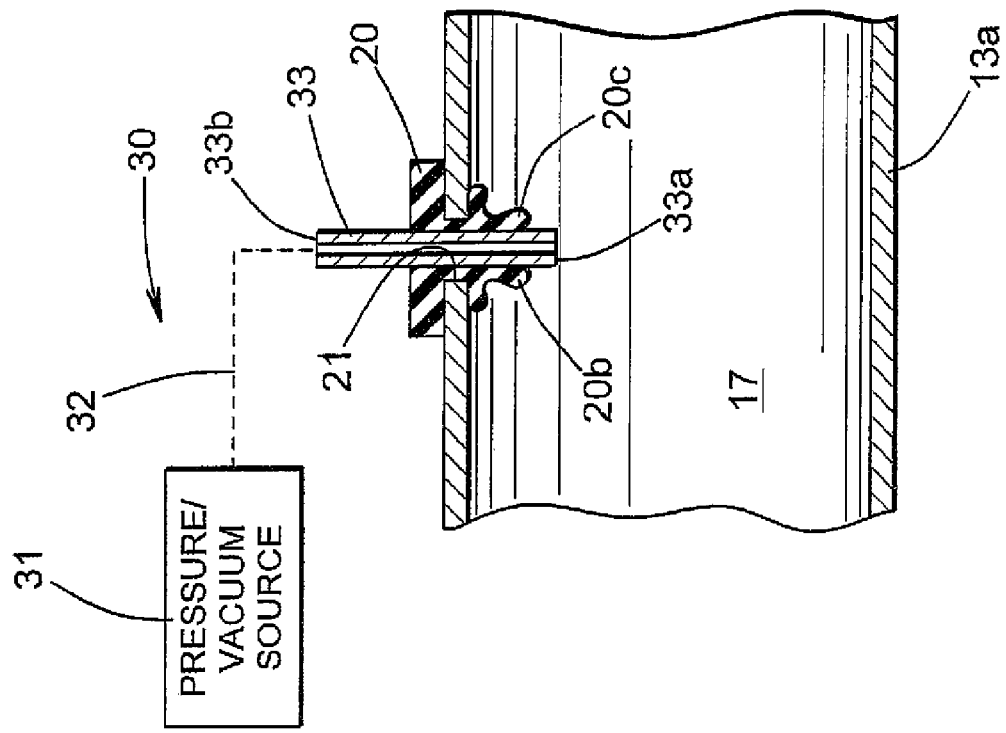
FIG. 4 is a sectional elevational view similar to FIG. 3 showing an apparatus for selectively pressurizing and evacuating an internal chamber of the axially adjustable driveshaft assembly.
Figure 3:
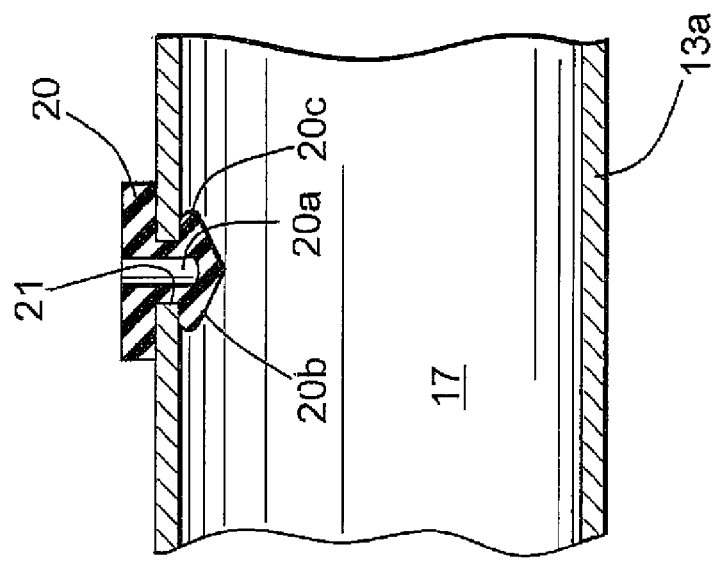
FIG. 3 is a further enlarged sectional elevational view of a portion of the axially adjustable driveshaft assembly illustrated in FIGS. 1 and 2.

As best shown in FIGS. 3 and 4, a valve 20 is provided for facilitating the selective pressurization and evacuation of the internal chamber 17 within the driveshaft assembly 13 relative to the ambient air pressure outside of the driveshaft assembly 13. In the illustrated embodiment, the valve 20 is disposed within an aperture 21 formed through the first driveshaft section 13a of the driveshaft assembly 13. However, the valve 20 may be provided at any other desired location that communicates with the internal chamber 17 thereof. The valve 20 is provided to normally prevent air from passing either into or out of the internal chamber 17 of the driveshaft assembly 13.

In the illustrated embodiment, the valve 20 is an annular elastomeric member having a central passageway portion 20a and a pair of sealing portions 20b and 20c. The central passageway portion 20a extends from the exterior of the first driveshaft section 13a to the interior thereof. The sealing lip portions 20b and 20c are provided at the inner end of the central passageway portion 20a. As shown in FIG. 3, the sealing lip portions 20b and 20c normally engage one another so as to provide an air-tight seal therebetween. However, the valve 20 may be formed having any desired structure for normally preventing air from passing either into or out of the internal chamber 17 of the driveshaft assembly 13.

FIG. 4 illustrates an apparatus, indicated generally at 30, that cooperates with the valve 20 for selectively varying the pressure within the internal chamber 17 of the driveshaft assembly 13, either by pressurizing and evacuating same. In the illustrated embodiment, the apparatus 30 includes a pressure/vacuum source 31 that is connected through a conduit 32 to a needle 33. The pressure/vacuum source 31 is conventional in the art and may be embodied as any structure or combination of structures capable of functioning either as a source of positive pressure or as a source of negative pressure relative to the ambient pressure. For example, the pressure/vacuum source 31 may be embodied as a conventional air pump that can be operated in a first mode to provide positive air pressure at an outlet thereof and in a second mode to provide negative air pressure at the outlet thereof The needle 33 is also conventional in the art and may be embodied as any structure that is capable of selectively being inserted through the valve 20 so as to separate the sealing lip portions 20b and 20c and, as a result, release the air-tight seal therebetween. For example, the needle 33 may be embodied as a conventional hollow, cylindrical member having a first end 33a that is adapted to be inserted through the valve 20 and a second end 33b that is adapted to communicate with the conduit 32. Preferably, the needle 33 is sized to fit easily within the central passageway portion 20a of the valve 20 to facilitate the insertion of the first end 33a therethrough. Lastly, the conduit 32 is conventional in the art and may be embodied as any structure or combination of structures capable of providing fluid communication between the outlet of the pressure/vacuum source 31 and the second end of the needle 33. Thus, when the apparatus 30 is operated, the positive or negative pressure that is provided at the outlet of the pressure/vacuum source 31 is transmitted through the conduit 32 to the first end 33a of the needle 33.

Figure 2:
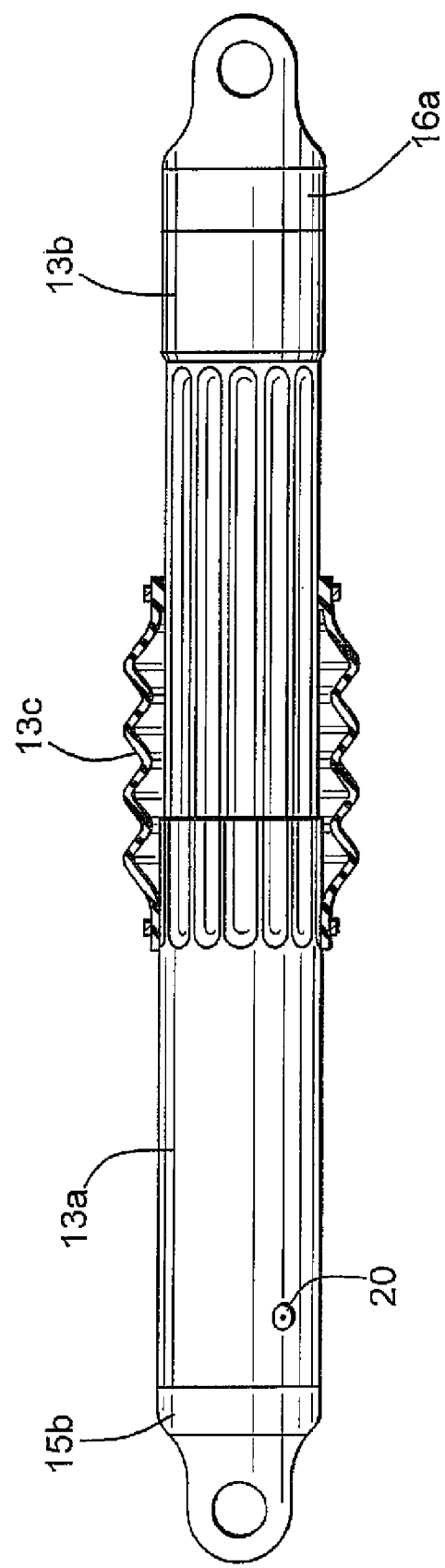
FIG. 2 is an enlarged side elevational view, partly in cross-section, of the axially adjustable driveshaft assembly illustrated in FIG. 1.
Figure 5:
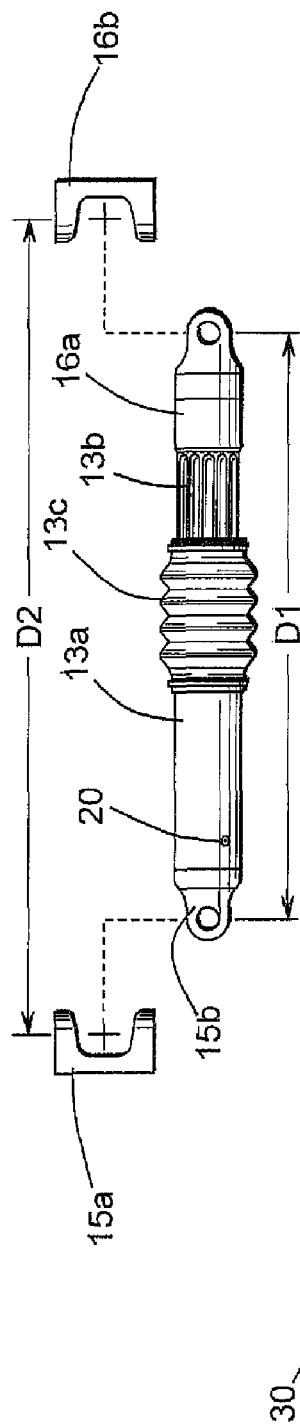
FIG. 5 is a side elevational view schematically showing a first step of a method of installing the axially adjustable driveshaft assembly illustrated in FIGS. 2 through 4 into the vehicle drive train system illustrated in FIG. 1.
Figure 6:
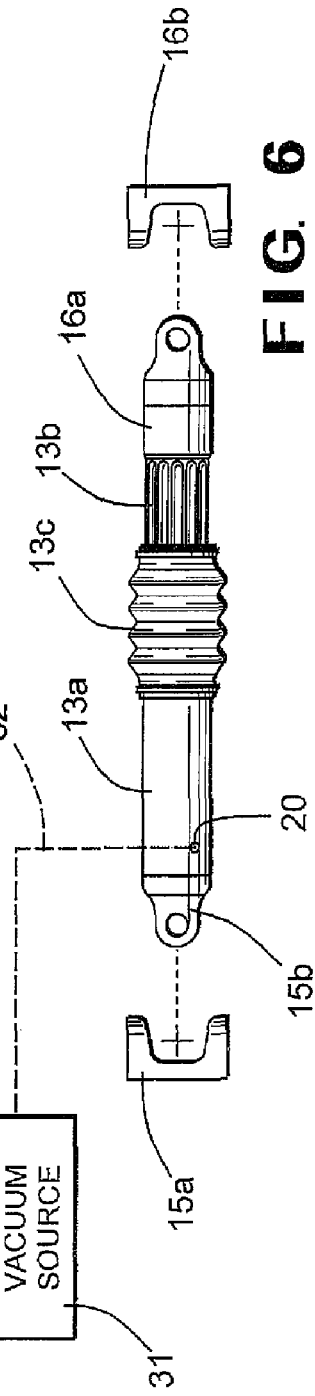
FIG. 6 is a side elevational view similar to FIG. 5 showing a second step of the method of installing the axially adjustable driveshaft assembly into the portion of the vehicle drive train system.
Figure 7:
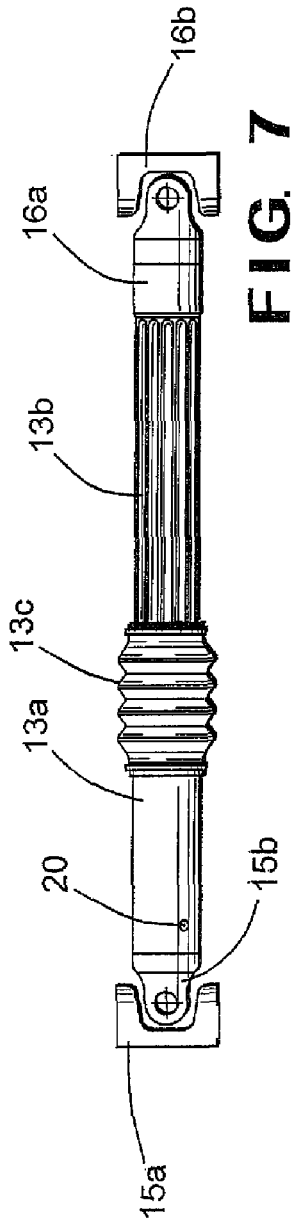
FIG. 7 is a side elevational view similar to FIG. 6 showing a third step of the method of installing the axially adjustable driveshaft assembly into the portion of the vehicle drive train system.

FIGS. 5, 6, and 7 illustrate a method of installing the axially adjustable driveshaft assembly 13 illustrated in FIGS. 2 through 4 into the vehicle drive train system 10 illustrated in FIG. 1. Typically, the driveshaft assembly 13 (including the end fittings 15b and 16a) is manufactured at a first location, then shipped to a second location for assembly into the remainder of the drive train system 10. Consequently, as mentioned above, the driveshaft assembly 13 has a length (indicated at D1 in FIG. 5 and defined by the end fittings 15b and 16a) that is somewhat different from a length separating the source of rotational power from the rotatably driven mechanism in the drive train system 10 (indicated at D2 in FIG. 5 and defined by the end fittings 15a and 16b). The length D1 defined by the driveshaft assembly 13 may be either shorter than the length D2 defined by the drive train system 10 (as illustrated) or longer. Regardless, to install the driveshaft assembly 13 in the drive train system 10, it is desirable that the length defined by the driveshaft assembly 13 be initially adjusted to correspond with the length D2 defined by the drive train system 10 to facilitate the installation process.

To accomplish this, the needle 33 of the apparatus 30 is inserted through the valve 20 as shown in FIG. 6, thereby separating the sealing lip portions 20b and 20c and releasing the air-tight seal therebetween, as described above. Then, the pressure/vacuum source 31 is operated so as to provide either positive or negative pressure at the outlet thereof. If the length D1 defined by the driveshaft assembly 13 is shorter than the length D2 defined by the drive train system 10, then positive pressure is provided at the outlet of the pressure/vacuum source 31. Such positive pressure is transmitted through the conduit 32 and the needle 33 to the internal chamber 17 of the driveshaft assembly 13. As a result, the first and second driveshaft sections 13a and 13b are axially extended relative to one another. The application of such positive pressure is continued until the length D1 defined by the driveshaft assembly 13 is equal to the length D2 defined by the drive train system 10. At that time, the pressure/vacuum source 31 is turned off, and the needle 33 is removed from the valve 20. Thereafter, the driveshaft assembly 13 can be installed within the drive train system 10, as shown in FIG. 7.

On the other hand, if the length D1 defined by the driveshaft assembly 13 is longer than the length D2 defined by the drive train system 10, then negative pressure is provided at the outlet of the pressure/vacuum source 31. Such negative pressure is transmitted through the conduit 32 and the needle 33 to the internal chamber 17 of the driveshaft assembly 13. As a result, the first and second driveshaft sections 13a and 13b are axially retracted relative to one another. The application of such negative pressure is continued until the length D1 defined by the driveshaft assembly 13 is equal to the length D2 defined by the drive train system 10. At that time, the pressure/vacuum source 31 is turned off, and the needle 33 is removed from the valve 20. Thereafter, the driveshaft assembly 13 can be installed within the drive train system 10, again as shown in FIG. 7.

As mentioned above, the scope of this invention is not intended to be limited for use with the specific structure for the drive train system 10 illustrated in FIG. 1. Rather, this invention may be used to facilitate the installation of any type of driveshaft assembly having two (or more) components that are connected together for concurrent rotational movement and for relative axial movement in any type of drive train system. For example, it is contemplated that this invention may be used to facilitate the installation of the driveshaft assembly 13 in a conventional rotational balancing machine (not shown). Such rotational balancing machines are adapted to rotate the driveshaft assembly 13 and identify one or more locations where balance weights can be secured thereto so as to rotational balance the driveshaft assembly 13.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of installing an axially adjustable driveshaft assembly in a drive train system comprising:
   (a) providing a first driveshaft section being hollow therethrough and having either a female or a male splined end, and a first driveshaft section end fitting;
   (b) providing a second driveshaft section being hollow therethrough and having the other of a female or a male splined end, and a second driveshaft section end fitting;
   (c) providing a valve disposed in an aperture formed through one of the driveshaft sections;
   (d) inserting the driveshaft section having the female splined end about the driveshaft section having the male splined end, thereby forming the axially adjustable driveshaft assembly with a sealed internal chamber defined by the valve, the interior surfaces of the first and second driveshaft sections, and the first and second driveshaft section end fittings, the valve preventing ambient air from passing into or out of the sealed internal chamber; and
   (e) selectively pressurizing and evacuating the sealed internal chamber by either connecting a pressurized air or vacuum source to the valve to fill the chamber with air or to remove air from the chamber, so as to correspondingly increase or decrease a drive train system length, thereby the female splined end slides axially relative to the male splined end allowing relative axial movement therebetween, thus facilitating an installation process of the axially adjustable driveshaft assembly between a transmission and an axle assembly in the drive train system.

2. The method defined in claim 1 further comprising connecting a transmission output shaft to the first driveshaft section by way of a first universal joint having a transmission shaft end fitting connected to the transmission output shaft and the first driveshaft section end fitting connected to a forward end of the first driveshaft section.

3. The method defined in claim 2 further comprising connecting a cross assembly to both the transmission shaft end fitting and the first driveshaft section end fitting.

4. The method defined in claim 1 further comprising connecting the second driveshaft section to an axle assembly input shaft by way of a second universal joint having an axle shaft end fitting connected to the axle assembly input shaft and the second driveshaft section end fitting connected to a rearward end of the second driveshaft section.

5. The method defined in claim 4 further comprising connecting a cross assembly to both the second driveshaft section end fitting and the axle shaft end fitting.

6. The method defined in claim 1 wherein the pressurized air or vacuum source is connected to the valve by way of a conduit to a needle that is selectively inserted through a passageway portion formed through the valve.

7. The method defined in claim 1 wherein the valve further includes first and second sealing lip portions that normally engage one another so as to provide an air-tight seal therebetween.

8. The method defined in claim 1 wherein the valve is formed from an elastomeric material.

9. The method defined in claim 1 further comprising providing a flexible boot over adjacent portions of the first and second driveshaft sections.

10. The method defined in claim 1 wherein a transmission output shaft and an axle assembly input shaft are non-coaxially aligned.

11. The method defined in claim 1 further comprising adjusting the drive train system length defined by the separation between the first and second driveshaft section end fittings to correspond with a length defined by the separation between the transmission shaft end fitting and the axle shaft end fitting.

12. The method defined in claim 1 wherein the hollow female driveshaft section is a splined member being cylindrical in shape and having a plurality of inwardly extending splines formed on the inner surface thereof and the hollow male driveshaft section is a splined member cylindrical in shape and having a plurality of outwardly extending splines formed on the outer surface thereof, thereby allowing relative axial movement between the transmission and the axle assembly.

* * * * *